United States Patent [19]
Jolliffe

[11] Patent Number: 5,429,785
[45] Date of Patent: Jul. 4, 1995

[54] METHOD OF MAKING BIAXIALLY ORIENTED THERMOPLASTIC FILMS

[75] Inventor: Charles N. Jolliffe, Circleville, Ohio

[73] Assignee: E.I. Du Pont de Nemours and Company, Wilmington, Del.

[21] Appl. No.: 203,247

[22] Filed: Mar. 1, 1994

[51] Int. Cl.$^6$ .................................... B29C 55/16
[52] U.S. Cl. .................. 264/216; 264/235.8; 264/290.2
[58] Field of Search ............. 264/25, 216, 235.8, 264/290.2

[56] References Cited

U.S. PATENT DOCUMENTS

| | | | |
|---|---|---|---|
| 3,150,433 | 9/1964 | Kampf | 26/73 |
| 3,231,642 | 1/1966 | Goldman et al. | 264/567 |
| 3,510,552 | 5/1970 | Tsuruta et al. | 264/235.8 |
| 3,932,919 | 1/1976 | Hutzenlaub | 26/73 |
| 4,803,027 | 2/1989 | Peiffer et al. | 264/210.5 |
| 5,051,225 | 9/1991 | Hommes et al. | 264/288.4 |

FOREIGN PATENT DOCUMENTS 515863 12/1992 European Pat. Off. .

*Primary Examiner*—Leo B. Tentoni

[57] ABSTRACT

A method is provided for the production of ultrathin films having a thickness of 2.5 microns or less, including film having a thickness as low as about 0.2 microns. Film of thermoplastic polymer, preferably polyester film, less than 25 microns in thickness and in thermal equilibrium with the surrounding air is simultaneously stretched at least twice and up to about five times its original dimensions in the machine and cross-machine directions under conditions such that thicker regions are maintained at an elevated temperature by radiant heating and at least a 0.1° C. temperature differential is established between the thicker (hotter) regions and the thinner (cooler) regions of the film prior to stretching the film beyond its elastic limit. The ultrathin films produced according to this invention have acceptable uniform thickness necessary for commercial applications thus providing consistent electrical performance when used as the dielectric medium in miniature capacitors and uniform heat transfer characteristics suited for high resolution thermal transfer media or digital stencils.

14 Claims, 2 Drawing Sheets

METHOD OF MAKING BIAXIALLY ORIENTED THERMOPLASTIC FILMS

BACKGROUND OF THE INVENTION

1. Field of the Invention

The field of art to which this invention pertains is biaxially oriented thermoplastic films. The invention is further directed to a method of making such films.

More specifically, in a preferred embodiment, a relatively thin polyester film is biaxially stretched simultaneously in a tenter frame to provide an exceptionally thin film having improved gauge (thickness uniformity) and improved freedom from process interruptions due to film breaks during stretching. The film is maintained within an orientation temperature range, by use of radiant heaters, during the stretching step. Ultrathin films having a thickness of less than 2.5 microns can be readily manufactured using this method.

2. Description of the Related Art

It is well known in the art that some physical properties of thermoplastic films, including tensile strength and modulus of elasticity, may be improved by stretching the film.

The stretching techniques which have been previously used vary widely depending on the type of films involved, the methods of making those films, the properties being sought and other factors. For example, in a typical process, the film, in the form of a continuous web, may be stretched either sequentially using rollers for machine direction stretching and a tenter frame for cross-machine stretching, or simultaneously in an appropriately equipped tenter to properly orient the film and thereby improve its properties. In other instances, the stretching operation may be carried out by casting film in tubular form and stretching in an appropriate apparatus using a combination of tubular expansion and machine-direction stretching techniques.

The present invention is specifically directed to an improved method of making ultrathin biaxially oriented films in a tenter frame. Such films have acceptably uniform gauge with a minimum of gauge variations in the transverse and longitudinal directions. The films are ultrathin, having a thickness of 2.5 microns or less.

In the stretching method of this invention, a molten polymer is extruded onto a quenching surface through an orifice and cooled to form a continuous web of film which is then stretched to form the desired film product. It is very difficult, in the manufacture of polymeric film formed by extrusion and stretching of a film web, to achieve sufficiently uniform thickness over the entire web. The as-cast film always contains numerous narrow zones or regions extending in the longitudinal or machine-direction of the film web which are thicker or thinner than the mean of the film. These zones or gauge bands result from a variety of causes including differences in temperature or viscosity of the extruded polymer melt, variations in roughness or wettability of the extrusion die lip and for other reasons. This variation in thickness, referred to as transverse gauge variation, is measured by scanning the thickness profile of the film in the transverse or cross-machine direction. Variations in thickness also are known to occur in the film web in the machine direction due to periodic vibration of equipment, variability in polymer pumping rate, or nonuniform stretching conditions, among other causes.

It further is known that stretching thermoplastic film by conventional methods generally causes magnification of gauge variations, or an increase in the percentage deviation from the mean or average thickness of a film in certain areas or zones of the film. This gauge variation magnification (i.e., increase in the ratio of the thickness of thick areas to the mean thickness and conversely, a decrease in the ratio of the thickness of thin bands or areas to the mean thickness), occurs upon applying stretching tension to the film because at a given temperature the thinner areas may be stretched more easily than the thicker areas so that differences in thickness are greater after stretching than before. The thin areas tend to stretch and decrease in thickness while the gauge of thicker portions may decrease substantially less, thus, gauge differences or variations between the thick and thin portions of the film are magnified.

In conventional practice it is known to heat a thermoplastic film web to a temperature at which it may be more readily oriented, prior to stretching. It is further known that the thinner regions of the web, as cast, tend to be raised more rapidly to a higher temperature than the thicker regions while being heated to an appropriate stretching temperature. This heating step tends to even further increase or magnify the gauge variations in the film since the thinner regions or portions will stretch even more during the stretching operation.

Therefore it is advantageous to follow the casting of orientable polymer films with a stretching technique which not only does not magnify, but preferably reduces, gauge variations in the stretched film. The present invention provides such a critical combination of conditions of stretching in which gauge variation magnification is substantially reduced or minimized.

More specifically in producing the ultrathin thermoplastic films of this invention (i.e., films having a final thickness of 2.5 microns or less) it has been found that improved gauge may be obtained in the stretched film by using a method in which the thicker regions or portions of the film are at a higher temperature than the thinner portions during stretching. It further is critical in the practice of this method that the appropriate temperature differentials between thick and thin portions be maintained during the stretching operation.

In the film making techniques of the prior art, hot-air heaters are typically used to heat the film. The film temperature is maintained or adjusted by impingement of hot air on the film. In the hot-air method of heating, heat input is proportional to the surface area and independent of film thickness. Thus, the thinner areas of the film tend to be heated faster because of their reduced mass per unit area compared to the average thickness, and temperatures of thicker areas tend to rise more slowly because of their greater mass per unit area. If stretching occurs before the entire film reaches temperature equilibrium, the thinner areas (which are at a higher temperature relative to the thicker areas) tend to stretch more, resulting in magnification of the gauge variation problem and, in the case of thin film, film breakage due to overstressing of the thinner regions. If the film is stretched after the film temperature has fully equilibrated with the air temperature then gauge magnification may still occur.

It is also known to use infrared or radiant heaters are used to heat the film either prior to or during stretching. Hot-air heaters are sometimes used in combination with radiant heaters. Further, various cooling and film pretreating techniques have been employed either during or prior to heating and stretching, all to improve the properties of the film. Typical examples of these techniques are described in U.S. Pat. No. 3,231,642 to Goldman et al and U.S. Pat. No. 3,510,552 to Tsuruta et al, for example. None of these stretching methods are suitable for stretching thin films in the thickness range of the present invention. They offer no means to maintain the temperature differentials of the thicker and thinner areas of the film within their proper stretching ranges or require additional steps, such as cooling during stretching, which would severely impact the operation of the method of the present invention and tend to render it inoperative.

In the Goldman patent, a relatively thick tubular film is extruded through an orifice, exposed to radiant heat and then stretched while being cooled. The cooling air in the stretching zone serves to cool the thin portions of the film faster, reinforcing them, and thus improving gauge uniformity. The tubular film, as cast, has a wall thickness of anywhere from 15 to 85 mils (e.g., from 381 to 2159 microns thick) and is stretched, while cooling, to a thickness ranging from 0.8 to 1.2 mils thick (e.g., 20.3 to 30.5 microns thick).

The Goldman process of heating the film to higher temperatures then cooling during stretching (utilizing the faster cooling rate of the thinner regions to create transient temperature differentials between thinner and thicker areas) would not be operative with thin films because these films would too quickly reach uniform temperature.

Further, in the process taught in the Tsuruta et al patent, 2 to 12% by weight of water is added in a pretreatment step to a relatively thick polyamide film prior to heating by conventional hot-air and infrared heaters. The film is then drawn at a temperature at least 30° C. below the melting point of the film to improve its gauge. The water is used to allow significantly greater elongation in the stretching process than is possible without it. A plasticizer is not required in the manufacture of ultrathin films of the type made by the method of the present invention.

The films stretched by the method of the present invention are sufficiently thin (i.e., under 25 microns) prior to stretching so that the absorption of energy, from the radiant heaters, is nearly proportional to thickness. Convective heat loss to the surrounding atmosphere is proportional to the film surface area. As a result, the thicker regions become hotter than the thinner regions such that the temperature differential at any point in the film is in an amount proportional to thickness at that point.

It is critical in the practice of this invention that the temperature differentials between regions of varying thickness be maintained at their proper levels during stretching. It has been found that these temperature differentials may be effectively maintained at appropriate levels, for these thin films in thermal equilibrium with surrounding atmosphere by the continued application of radiant heat. That discovery is the essence of this invention.

This condition would not apply to thicker films, such as those taught in Goldman et al patent. For such films, the energy absorbed by radiant heating is significantly less than proportional to thickness and temperature equilibrium is reached more slowly because of the greater mass per unit area. In that process the entire film must be heated above a desired temperature, then cooled during stretching so that the thinner regions become cooler than thicker ones for a brief time during which stretching occurs.

The Goldman process of heating and cooling the film would not be suitable for stretching ultrathin films since the desired temperature differentials could not be maintained between thicker and thinner portions of the film because rapid equilibration with the forced cooling air during the stretching step would cause the film temperature to become uniform. It is critical in the practice of the present invention that the thicker portions of the film remain at a higher temperature than thinner areas during the stretching step.

The present invention provides means to establish a temperature differential of at least 0.1° C. higher in regions of the film which are 5% thicker compared to the average thickness (and, conversely, temperature differentials of at least 0.1° C. lower in regions 5% thinner than average) before stretching begins or early in the stretching process. It is preferred that the appropriate temperature differentials be established prior to stretching the film beyond its elastic limit, about 3% elongation for polyethylene terephthalate. The temperature differentials between the thicker and thinner regions of the film are established by a localized heat balance where the heat input is controlled by the film thickness and the absorption characteristics of polymer for the energy flux from the radiant heaters while the heat loss to the surrounding atmosphere is controlled by air movement. It is preferred to minimize the air movement in the vicinity of the film web in order to maintain the proper temperature differentials without moderating the temperature difference between the thick and thin regions. Alternatively, air flow in a direction parallel to and, preferably concurrent with and at a similar speed as, the film is also acceptable. It is critical to the practice of this invention that the desired temperature differentials are not eliminated by excessive air movement during stretching. Forced air impingement against the thin film web will diminish or eliminate the temperature differential between the thicker and thinner regions of the film.

For these and other reasons, it has long been known to the art that it is extremely difficult to manufacture ultrathin films, particularly those having a final thickness of 2.5 microns or less. It is not only difficult to obtain acceptably uniform gauge in the final film product, but film breaks commonly occur during processing. Gauge variations in the extruded film web are a prime cause of this problem. As previously indicated, the thinner portions of the film are generally weaker than the thicker portions and during stretching they become progressively thinner and tend to break creating runnability problems with the stretching operation. This is particularly noticed when producing thin film in the form of a continuous web which is to be wound into a roll. Breakdowns occur so frequently that it is very difficult to produce a wound roll web having a length of at least 5000 meters.

Prior art processes to improve runnability in ultrathin film manufacture have focussed primarily on methods wherein a laminate film structure is produced by coextrusion or lamination, the laminate is oriented by stretching, and subsequently delaminated to provide the ultrathin film. Difficulties are frequently encountered in the coextrusion process, in maintaining appropriate flow velocities of the individual molten polymer streams and in setting the profile of the various layers at coextrusion to obtain a uniform thickness profile across the width of the extruded film. The individual films in the laminate must adhere during stretching yet be easily delaminated after orientation. Non-uniform adhesion between the layers during delamination can result in film breaks or wrinkles in the wound roll.

A typical example for improving the runnability of thin films by a process of the type described above is seen in European Patent Application 92107411.8. The method of the instant application for making and winding a self supporting thin film (an ultrathin film thickness of 2.5 microns or less) without the need for laminating reinforcement represents a distinct improvement over this process.

Film gauge variations also present a serious problem in winding up the film to obtain acceptable roll formation. For example, the thicker sections in a continuous length of film provide hard surfaces on the wound rolls while the thinner sections are soft. Such rolls have a tendency to wrinkle or telescope during handling. Furthermore, it is difficult to maintain an even tension upon such film when unwinding the roll, thus making slitting difficult. Moreover, film having relatively high gauge variations across its width is also difficult or impossible to handle in various types of converting equipment.

It is, therefore, important that these gauge variations be reduced, and that runnability be improved so as not to prevent or hinder the ready formation of smooth finished rolls for subsequent film processing such as vacuum metallization, coating and lamination.

Accordingly, a method has long been sought for making a biaxially oriented ultrathin film thickness of 2.5 microns or less with acceptably uniform gauge, in tenter frame, without confronting the problems of runnability and gauge uniformity as seen in the prior art.

The present invention provides such a method by surprisingly finding that it is possible to make extremely thin films of this type by using radiant heaters to maintain the temperature of the film at acceptable levels in the stretching zone. More specifically, it has been found that these heaters can be used to effectively maintain the proper temperature differentials between the thicker and thinner regions of thin film in thermal equilibrium with the surrounding air during stretching. If forced air heat is used, these levels cannot be readily maintained, particularly in stretching film having a cast thickness of less than 25 microns, as in this invention. By using these radiant heaters to heat the film during stretching, biaxially oriented ultrathin films having thickness of 2.5 microns or less can be readily made, using simultaneous stretching techniques with minimal runnability problems. Ultrathin films, having thickness as low as 0.2 microns, may be produced using this method. Such films, in acceptable commercial length of over 5000 meters, can be wound into a roll.

SUMMARY OF THE INVENTION

Briefly described, this invention is a method of making an extremely thin biaxially stretched thermoplastic film having a thickness of 2.5 microns or less and as thin as 0.2 microns.

Such method, in its most basic form, includes the steps of:

forming a film having a thickness of less than 25 microns moving the film into a tenter frame heating the film to an orientation temperature in the tenter frame prior to stretching maintaining the film within an orientation temperature range, using radiant heaters, in a film stretching section of the tenter frame while simultaneously stretching the film biaxially to form a biaxially stretched film having a thickness of 2.5 microns or less.

Preferably the film is simultaneously stretched biaxially to form a film having a thickness of less than 1.0 micron.

In other embodiments, the film is in the form of a polyester film which is stretched simultaneously to a thickness of about 0.6 microns. The film may also be simultaneously stretched biaxially to a thickness of from about 0.2 to 1.0 microns.

Films which have been biaxially stretched in accordance with this invention will have gauge uniformity suitable for commercial applications with a thickness variation of typically less than 25%.

Thermoplastic films and particularly polyester films having a thickness of less than 25 microns prior to stretching may be stretched by the method of this invention. Generally the film is stretched at least 2 times its original dimensions in the machine and cross-machine directions and preferably is stretched from at least 2 times to about 5 times its original length in the machine direction and from at least 2 times to about 5 times its original width in the cross-machine direction.

The film made by this method is preferably in the form of a continuous web which may wound onto a windup roll. The length of the web so wound is preferably at least 5000 meters. An acceptable commercial roll may be formed using this method.

In greater particularity this invention is a method of making a thin biaxially stretched polyethylene terephthalate film including the steps of:

casting a molten polymer of polyethylene terephthalate onto a quenching surface and cooling the polymer to form a self-supporting film having a thickness of less than 25 microns moving the film into a tenter frame heating the film to an orientation temperature of from about 80° to 120° C. using radiant heaters, in a film stretching section of the tenter frame while simultaneously stretching the film biaxially to form a biaxially stretched polyester film having a thickness of 2.5 microns or less.

The method may also include the further step of heat setting the film, while maintaining such film within a temperature range of from about 185° to 220° C. Preferably radiant heaters are used to heat the film at the proper temperature in the heat-setting zone.

This invention further provides a method of making a thin biaxially stretched polyethylene naphthalate film including the steps of:

casting a molten polymer of polyethylene naphthalate onto a quenching surface and cooling the polymer to form a self-supporting film having a thickness of less than 25 microns moving the film into a tenter frame heating the film to an orientation temperature in the tenter frame prior to stretching maintaining the film within an orientation temperature range of from about 115° to 165° C. using radiant heaters, in a film stretching section of the tenter frame while simultaneously stretching the film biaxially to form a biaxially stretched polyethylene naphthalate film having a thickness of 2.5 microns or less.

After stretching, this film is preferably heat set, using radiant heaters, while maintaining the film within a temperature range of from about 185° to 245° C.

The polyethylene naphthalate film as biaxially stretched has preferably a thickness of 1.75 microns or less.

Lastly, the biaxially stretched polyethylene terephthalate and polyethylene naphthalate films made using the above-described methods form a significant part of this invention.

DESCRIPTION OF THE PREFERRED EMBODIMENTS

Figure 1:
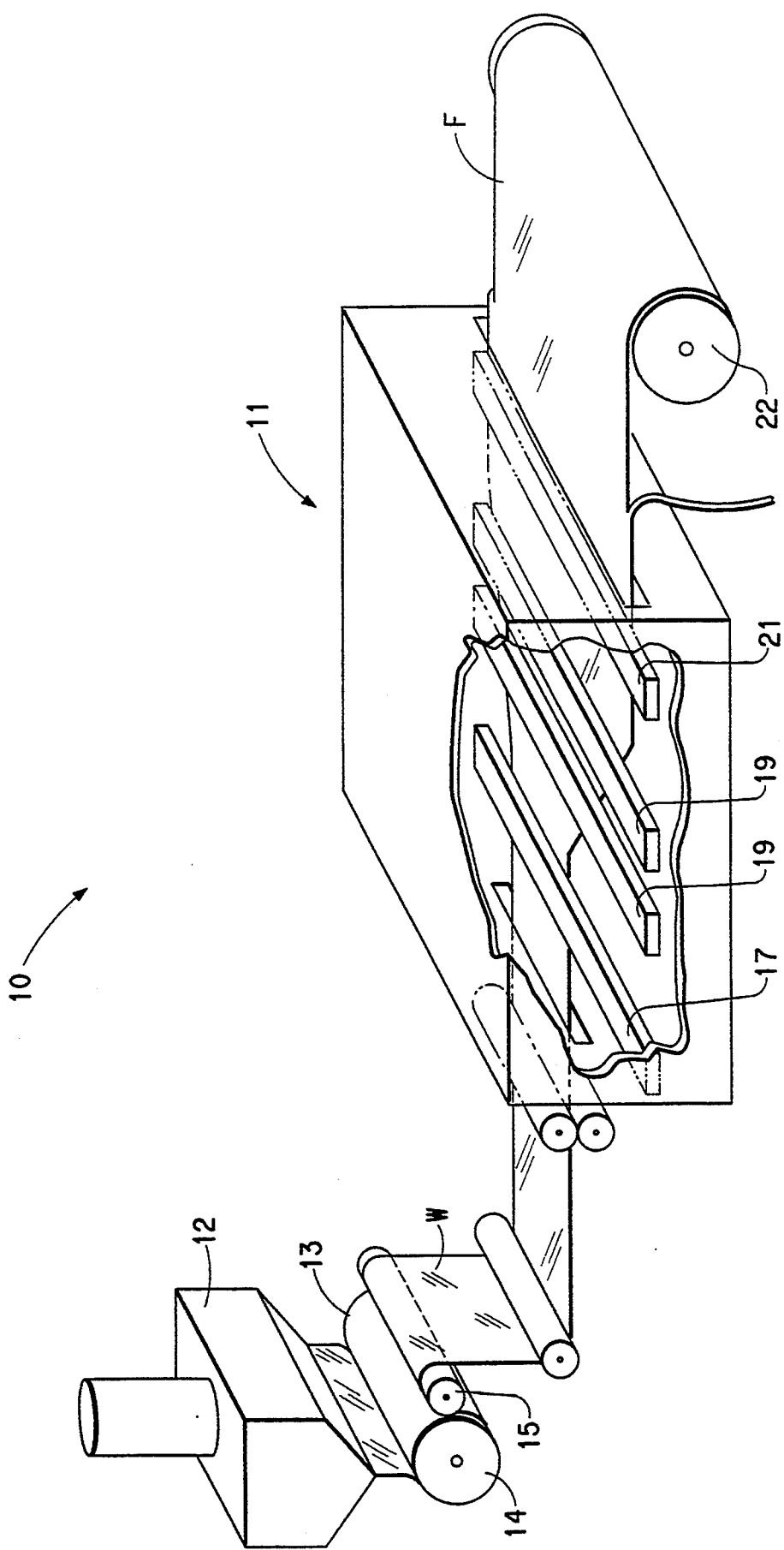
FIG. 1 is a diagrammatic view of a suitable apparatus for making biaxially-oriented ultrathin film in accordance with this invention.

This invention primarily involves a method of making a biaxially oriented film. The film, in the form of an elongated web, is simultaneously stretched biaxially, in a tenter frame, while being heated to form such film. The film, which in and of itself is a significant part of this invention, is extremely thin (e.g., 2.5 microns thick or less) and has acceptably uniform thickness, which characteristics particularly adapt it for use in electrical applications, including use as the dielectric medium in miniature capacitors. These properties also enable the film web to be wound into a commercial size roll, which also forms a part of this invention. Thin films of uniform thickness are also particularly important for applications such as digital stencil and thermal transfer media wherein the uniform heat transfer properties of the thin film are required to obtain high resolution. It is especially critical to use a very uniform thin film in thermal transfer media which use dye sublimation.

More specifically, the method of this invention is particularly suited for producing biaxially oriented polymer films with improved thickness uniformity from amorphous as well as crystallizable thermoplastic polymer.

Suitable thermoplastic polymers include but are not limited to amorphous non-crystalline polymers such as polystyrene and polyacrylates as well as crystallizable polymers including polyolefins, polyamides, and polyesters. Preferred are crystallizable polyesters containing as the major acid component an aromatic dicarboxylic acid (or the lower alkyl ester thereof) and as the major glycol component an alkylene glycol. Examples of the aromatic dicarboxylic acid include but are not limited to terephthalic acid, isophthalic acid, naphthalenedicarboxylic acid, diphenoxyethanedicarboxylic acid, diphenyletherdicarboxylic acid, diphenylsulfodicarboxylic acid, and diphenylketonedicarboxylic. Most preferred are terephthalic acid or naphthalenedicarboxylic acid. The preferred alkylene glycol is ethylene glycol. Suitable copolymerizable components which may be added to optimize properties of the desired films as is well known in the art include diols such as diethylene glycol, propylene glycol or neopentylglycol; aromatic diacid components such as phthalic acid, and isophthalic acid; and aliphatic diacid components such as sebacic acid and adipic acid. Polyethylene terephthalate (PET) or polyethylene2,6-naphthalate (PEN) is especially suitable for the film produced by this method. The method is also applicable to polyester copolymers of PET and PEN, copolymers comprising more that 70% by weight of either PET or PEN, and polymer blends formed by combination of suitable polymers providing that the blend exhibits orientation characteristics typical of PET and PEN during the film forming process.

The polymer may also contain insoluble (inorganic or organic) particles internally precipitated or externally added as is well known in the art to serve as a lubricant facilitating film handling including winding of the film roll.

Figure 2:
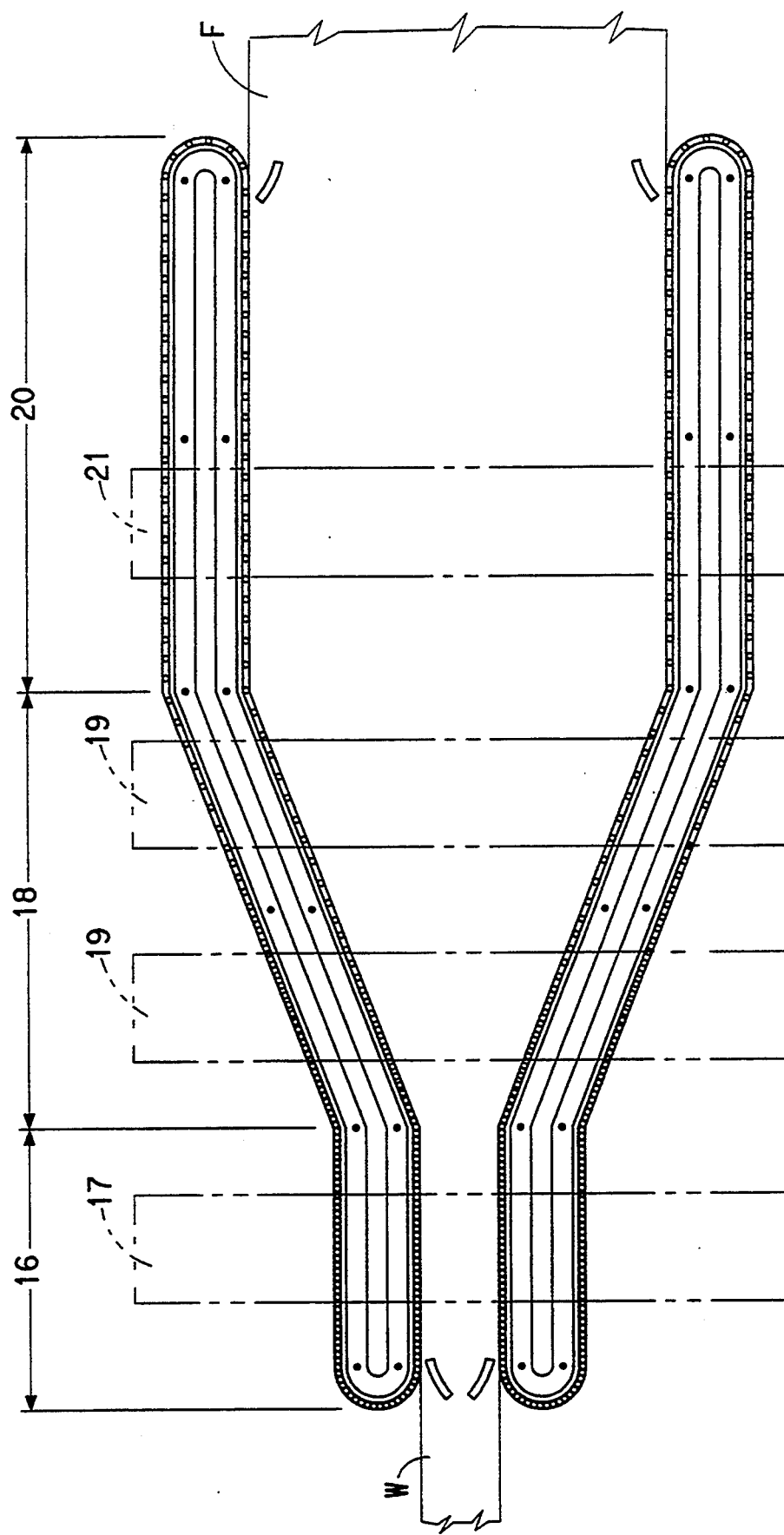
FIG. 2 is a schematic top plan view of the tenter frame of the apparatus shown in FIG. 1 wherein a web of film initially less than 25 microns thick may be stretched to form an ultrathin film having a thickness of 2.5 microns or less.

Referring to the drawings, FIGS. 1 and 2 show an apparatus 10 suitable for practicing the method of this invention for orienting thermoplastic film, such as polyethylene terephthalate film, to provide a stretched film, having desired physical properties.

Referring specifically to FIG. 1, it will be seen that the film to be oriented by apparatus 10 is supplied from a supply source and moved into a tenter frame, generally designated 11, where it is stretched simultaneously in the machine and cross-machine directions to form the biaxially oriented film of this invention.

The film to be oriented may be obtained from any appropriate source, such as a supply roll for example. In the embodiment shown in FIG. 1, the film is supplied to the tenter frame in the form of a continuous web W as it emerges from a typical film production line. This is the preferred film supply source.

In this latter instance, a molten polymer, preferably polyethylene terephthalate, is typically melt-extruded through a slit orifice in a die 12 and cast onto the quenching surface 13 of an internally-cooled rotating quench drum 14 held at a temperature of about 30° C. to produce a substantially amorphous self-supporting film in web form W.

The web W is stripped from the drum by passing it over a stripper roll 15 and moved onto the tenter frame 11 where it is simultaneously stretched biaxially in the machine and cross-machine directions to orient it.

In making the thin films of this invention, the "as cast" thickness of the main center portion of the extruded film web W should be no greater than 25 microns. The edges or beads of the web are typically required to be substantially thicker than this in order to support the web during movement and, particularly, during the stretching operation in the tenter frame. The die openings may be properly adjusted to provide the required thickness profile. After stretching, the thick edges are slit from the web prior to winding the thin film into a roll.

It is important that certain operational conditions be observed while orienting the film in the tenter frame.

As shown in FIG. 2, the web of film is first moved into a heating section 16 in the tenter oven where it is heated to an orientation temperature prior to stretching. The orientation temperature range for polyethylene terephthalate (PET) is typically from 80° to 120° C. It is preferred that radiant heaters, such as shown at 17, be used to heat the relatively thin web W in this section, for reasons further to be explained. Forced air heat, or a combination of air and radiant heat may also be used to heat the web to its pre-stretched orientation temperature, but radiant heat is preferred, to establish the desired temperature differences prior to stretching The web W is then moved into a stretching section 18 where it is simultaneously biaxially stretched in the machine and cross-machine directions to a thickness of 2.5 microns or less. The temperature of the web needs to be maintained within an appropriate orientation temperature range for the polymer used. For PET this range is from about 80° to 120° C. It is critical that the proper temperature differentials between the thicker and thinner gauge regions in the film be established prior to stretching the film beyond its elastic limit. It is only possible to establish and maintain the proper temperature differentials by using radiant heaters, as shown at 19. If forced air heat is also used it not only may cause film breaks, which impact runnability, but it tends to diminish or eliminate the temperature differential and thus the gauge improvements sought for the film.

The film is stretched at least 2 times its original dimensions in each direction in the stretching section 18 to form an ultrathin film of less than 2.5 microns. Other stretching ratios and/or "as cast" web thickness may be used to form films, according to the present invention, including films having thicknesses as small as 0.2 microns.

The "orientation temperature range," as defined herein, refers to the temperature range in which molecular orientation of a polymeric film may be effected. Below the orientation temperature range the film tends to break. Above the orientation temperature range the film elongates without orienting. The specific orientation range for a given thermoplastic polymer can be readily determined by one skilled in the art. The range lies somewhere below the melting temperature of a polymer that melts at a specific temperature or below the crystalline melting point of a crystalline polymer that melts over a range of temperatures. The crystalline melting point refers to the temperature at which the crystallites of a crystalline polymer are no longer detectable under X-ray examination when the solid polymer is heated until it melts.

After the film web W has been biaxially stretched in the stretching section 18, it is optionally moved into a heat setting section 20 where it is heat set within a range appropriate for the polymer used. For polyethylene terephthalate, this temperature range is from about 185° to 220° C. Again, it is important that the film temperature be maintained within this temperature range during this heat setting step. It is important that radiant heaters, such as shown at 21, again be used to so maintain this temperature range. The film is very thin in this section and forced air heat might cause the web to break.

The film F produced by this method, is extremely thin, having a thickness of less than 2.5 microns and depending on the "as cast" thickness and stretching ratios employed can have a thickness as little as 0.2 microns. This ultrathin film has acceptable uniform gauge, typically less than 25% thickness variation, and can be made with few runnability problems occurring. It further may be readily wound, in .commercial size lengths of over 5000 meters, onto a windup roll, as shown at 22 in FIG. 1, of the drawing.

An apparatus particularly suited for making the ultrathin film of this invention is shown in greater detail in U.S. Pat. No. 5,051,225 to Hommes et al. The only modifications required would be the addition, and use, of radiant heaters in the tenter frame to maintain the film at its proper operational temperatures in the heating, stretching and heat-setting sections, as described above. The teachings of this patent are incorporated by reference herein.

Other apparatus which also might be effectively used to make this film are shown in U.S. Pat. Nos. 3,150,433 to Kampf and 3,932,919 to Hutzenlaub. Again radiant heaters would be required to heat the film in the tenter frame, particularly in the stretching and optional heat setting sections.

In this practice of the present invention it is very important to maintain the temperature of the film within its orientation temperature range during the stretching operation, in the tenter frame. It has been found that to practice the present invention radiant heaters must be used for this purpose. It further has been found that there should be minimal air turbulence adjacent the film during heating in order for appropriate temperature differentials in the film to be properly maintained. This would preclude the use of forced-air heat in the stretching zone. It further would preclude the use of any forced air cooling in the stretching zone and, in fact, it has been found that no cooling should occur in this zone which is sufficient to eliminate the temperature differentials in the film or reduce the temperature within this zone to a temperature below its orientation range.

The use of radiant heat is critical to this tenter frame stretching method. If the film thickness is below about 25 microns, absorption of radiant energy by the film results in thinner portions of the film being at lower temperatures than thicker portions. This temperature differential causes the stress-strain curves of thinner regions to be above those of thicker regions (higher stress at a given strain), so the thin regions are strengthened and tend to stretch less than they would if temperatures were uniform. This is beneficial both to runnability (the thin regions are stronger and are less likely to break) and gauge uniformity (the thin regions stretch less relative to thick regions, making final thickness variation less than it would be with uniform film temperature). When using radiant heating for stretching ultrathin films it has been found that as the thickness increases, infra-red absorbance increases almost exactly proportionally, so more radiant energy per unit area is absorbed in thicker regions. Further, if the film is sufficiently thin it remains close to thermal equilibrium because of its very low heat capacity. At equilibrium the heat loss to the cooler atmosphere is equal to the heat input at all points. Heat loss to the air is proportional to the difference between film temperature and air temperature. Therefore at all points in the film the temperature is above air temperature by an amount which is approximately proportional to thickness.

The conditions described above apply only for films which are sufficiently thin. For thick films the assumptions do not hold: Thermal equilibrium may not be reached, and absorbed radiant energy is not proportional to thickness but is related to it non-linearly.

As a result the thicker areas may or will not be maintained at higher temperatures than the thinner areas, so the stretching advantage of the present invention will be lost.

Thicker films (e.g., those having a thickness greater than about 25 microns), will retain heat in both their thicker and thinner areas for a longer period of time than will thin film (e.g., those less than about 25 microns in thickness). For this reason, it is necessary in known prior processes, to initially heat the film and then quickly cool these thinner areas to an acceptable temperature so as to reinforce them, prior or during to stretching.

For thin films, the thicker and thinner areas are both quickly cooled, thus it has been found necessary to use radiant heaters to maintain a temperature differential between these areas during the stretching process.

The following examples will further illustrate the method of making ultrathin films, in accordance with this invention.

EXAMPLE 1

A thermoplastic film was formed by extruding a molten polyethylene terephthalate (PET) polymer from a film-forming die and solidifying it by cooling. The polymer was cast from a die onto a quench drum where it was cooled to produce a substantially amorphous self-supporting film in the form of a continuous web. This step is conventional. As is typical in processing of crystallizable polymers, the film was cooled quickly to minimize crystallization, because amorphous film is known to stretch more uniformly than film which is partially crystalline.

The film as cast was about 50 centimeters wide, and 6.34 microns thick across its central portion, except at the edges. The edges of the film were thicker to facilitate the transporting of the film over the quench drum and subsequent rollers, and to support the film edges during stretching. The film was typically cast at 19.8 meters a minute. The die was of conventional design, with appropriate means to allow adjustment of the cast film profile by adjusting the die lip opening at a plurality of points along the lip. A nominal opening was maintained between the lips to provide a suitable pressure drop considering the viscosity of the polymer and the flow rate. The cast film was then stripped from the quench drum and transported to the entrance of the tenter frame by rollers suitable to the configuration and relative location of the equipment.

At the entrance of the tenter frame the edges of the film were gripped by tenter clips that were initially open and then closed after the film edges were introduced into the jaws. For simultaneous stretching each clip jaw grips only a short length of the film to allow a relatively long non-gripped portion of thicker bead between adjacent clips which is free to stretch as the distance between clips widens during the stretching step. The film entering the clips is about room temperature.

After gripping the film the clips were moved in relatively straight parallel paths into a heating section where the temperature of the PET film was increased to reach an orientation temperature range in which the polymer can be oriented to increase its strength. Below a certain temperature the film tends to break; above a higher temperature it elongates without orienting. For PET film the orientation temperature range is from about 80° to 120° C.

The film was heated to an orientation temperature within the above range, in the heating section, prior to the start of stretching using radiant heaters. The film temperature was increased to the proper level by supplying enough heat energy given the heater characteristics, film, speed, film thickness, specific heat of the polymer, etc.

The clips were about 5 centimeters apart, center-to-center when entering the tenter frame. The clip paths were approximately parallel in an entrance zone of the tenter frame which was not heated and where the film was exposed to room air. The clips continued to move approximately parallel in the heating section. The film was heated in this section by a bank of radiant heaters located about 30 centimeters above the film. The heaters had flat surfaces exposed to the film. The heaters extended beyond the path of the tenter clips, to provide uniform radiant heat flux across the full film width.

After the heating section, the paths of the clips diverged and opposed pairs of the clips were accelerated causing them to separate from adjacent pairs to thereby stretch the heated film in the machine (longitudinal) and cross-machine (transverse) directions simultaneously. Radiant heaters were used to maintain the proper temperature differentials in the film, with the thicker areas hotter during stretching. Troublesome air turbulence was minimized by using only radiant heat in this section. The film was stretched 3 times its original length in machine direction and 3 times its original width in cross-machine direction.

After the stretching section, the tenter clip paths became approximately parallel again, and film was heat set by heating it in a heat setting section to a temperature which caused an increased crystallinity in the film. The PET film in this example was heated to a temperature of about 185° to 220° C. Heat setting reduces dimensional changes when film is later reheated, as occurs in subsequent processing or in some end uses. A bank of radiant heaters such as those described above was used to heat set the stretched film in this section. It is important in heat setting thin films to use radiant heat in the heat setting step. It offers the same benefit as in the stretching step because dimensional changes can still occur, during this phase of operation. It is also important to minimize air turbulence in this section.

The film after being stretched and heat set had a thickness of 0.64 microns. This ultrathin film was produced, with no film breakage or runnability problems, in a web length of 6139 meters. The thick bead edges were slit off and the central 0.8 meters wide thin film was wound onto a cylindrical core.

As previously indicated, thin films having a thickness within this range may be effectively made by following the method of this invention. And if desired even thinner films (i.e., ultrathin films of less than 2.5 microns thickness having a thickness as low as 0.2 microns) may be produced by this method. The benefit of the present invention is not observed for PET film having a final thickness greater than about 8 microns.

EXAMPLE 2

Films described in the following table were made by casting an initial film of polyethylene terephthalate polymer containing 0.7 percent by weight of particulate additive onto a water-cooled quench roll, then moving the film into a tenter frame.

The films were first heated with radiant heaters in a 2.75 meter long heating section, then stretched simultaneously about 3 times in the machine and 3.25 times in the cross-machine directions in a second 2.75 meter long stretching section with continued application of radiant energy. It was then moved through a heat setting section, where radiant heating was used to maintain temperature differentials with thicker regions hotter than thinner regions since gauge changes can continue to occur during heat setting. The unusable bead edges were slit from the film, leaving 0.8 meter wide film webs which were wound into rolls of the lengths shown in Table 1.

TABLE 1

| RUN | A | B | C | D |
| --- | --- | --- | --- | --- |
| Casting Speed, meters/minute | 17.1 | 19.0 | 19.6 | 20.7 |
| Cast film thickness, microns | 12.7 | 8.9 | 6.5 | 4.2 |
| Radiant heater power input in preheat section prior to stretching, kilowatts/sq m. | 3.26 | 3.72 | 5.74 | 5.43 |
| Computed temperature differential for +5% thickness deviation, prior to stretching, Degree C. | 0.53 | 0.51 | 0.52 | 0.37 |
| Final Film Thickness microns | 1.22 | 0.86 | 0.65 | 0.42 |
| Final Roll Length meters | 7300 | 4900 | 7600 | 7000 |
| Film surface roughness, Ra in nanometers measured by Talysurf | 43 | 32 | not measured | not measured |

EXAMPLE 3

Films were made as in Example 2.

The thickness variations of the final stretched films were assessed by measuring the cross-machine profiles with a non-contacting instrument sensitive to film thickness.

A total of 37 scans were made across each film in a succession of locations in order to obtain a fair sampling of the average profile. The percentage thickness variation of each profile was calculated as the maximum reading minus the minimum reading, divided by the average reading and multiplied by 100, and the average percentage for each film was taken as a measure of that film's thickness variation.

Table 2 lists the final film thicknesses and the percentage thickness variations measured by this method:

TABLE 2

| Roll | Average Thickness (microns) | Thickness Variation |
| --- | --- | --- |
| E | 1.2 | 30% |
| F | 1.2 | 21% |
| G | 0.9 | 30% |
| H | 0.9 | 25% |
| I | 0.6 | 22% |

The surprising result was that the percentage thickness variation did not become progressively worse as the absolute thickness was reduced, as is observed with films made using conventional stretching, i.e. having heated rollers for machine direction stretching followed by transverse stretching on a tenter frame using forced hot air heating.

I claim:

1. A method of making a thin biaxially stretched thermoplastic film including the steps of:
   forming a film having a thickness of less than 25 microns
   moving the film into a tenter frame
   heating the film to an orientation temperature in the tenter frame prior to stretching
   maintaining the film within an orientation temperature range, using radiant heaters, in a film stretching section of the tenter frame.
   while simultaneously stretching the film biaxially to form a biaxially stretched film having a thickness of 2.5 microns or less.

2. The method of claim 1 wherein the film is simultaneously stretched biaxially to form a film having a thickness of less than 1.0 microns.

3. The method of claim 1 wherein the film is biaxially stretched simultaneously to form a film having a thickness of about 0.6 microns.

4. The method of claim 1 wherein the film is simultaneously stretched biaxially to form a film having a thickness of from about 0.2 to 1.0 microns.

5. The method of claim 1 wherein the film as biaxially stretched has a thickness variation of less than 25%.

6. The method of claim 1 wherein the film has a thickness of less than 10 microns prior to stretching.

7. The method of claim 1 wherein the film is stretched at least 2 times its original dimensions in the machine and cross-machine directions.

8. The method of claim 1 wherein the film is stretched from at least 2 times to about 5 times its length in the machine direction and from at least 2 times to about 5 times its width in the cross-machine direction.

9. The method of claim 5 wherein the film is in the form of a continuous web which is wound into a windup roll and wherein the length of the web so wound is at least 5000M.

10. A method of making a thin biaxially stretched polyethylene terephthalate film including the steps of:
    casting a molten polymer of polyethylene terephthalate onto a quenching surface and cooling the polymer to form a self-supporting film having a thickness of less than 25 microns
    moving the film into a tenter frame
    heating the film to an orientation temperature of from about 80° to 120° C. using radiant heaters, in a film stretching section of the tenter frame
    while simultaneously stretching the film biaxially to form a biaxially stretched polyester film having a thickness of 2.5 microns or less.

11. The method of claim 10 including the further step of heat setting the film, using radiant heaters, while maintaining such film at a temperature of from about 185° to 220° C.

12. A method of making a thin biaxially stretched polyethylene naphthalate film including the steps of:
    casting a molten polymer of polyethylene naphthalate onto a quenching surface and cooling the polymer to form a self-supporting film having a thickness of less than 25 microns
    moving the film into a tenter frame
    heating the film to an orientation temperature in the tenter frame prior to stretching
    maintaining the film within an orientation temperature range of from about 115° to 165° C. using radiant heaters, in a film stretching section of the tenter frame
    while simultaneously stretching the film biaxially to form a biaxially stretched polyester film having a thickness of 2.5 microns or less.

13. The method of claim 12 including the further step of heat setting the film, using radiant heaters, while maintaining the film at a temperature of from about 185° to 245° C.

14. The method of claims 12 wherein the polyethylene naphthalate film as biaxially stretched has a thickness of less than 1.75 microns.

* * * * *